(12) United States Patent
Bush et al.

(10) Patent No.: US 10,518,291 B2
(45) Date of Patent: *Dec. 31, 2019

(54) DEVICE AND METHODS FOR MODIFYING SURFACES

(71) Applicant: The Procter & Gamble Company, Cincinnati, OH (US)

(72) Inventors: Stephan Gary Bush, Liberty Township, OH (US); Ted De Castro, Newton, MA (US); Dana Paul Gruenbacher, Fairfield, OH (US); Kenneth Lee Morand, Maineville, OH (US); Thomas Elliot Rabe, Baltimore, MD (US); Faiz Feisal Sherman, Mason, OH (US); Todd Michael Wernicke, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 336 days.

This patent is subject to a terminal disclaimer.

(21) Appl. No.: 14/968,248

(22) Filed: Dec. 14, 2015

(65) Prior Publication Data

US 2016/0101434 A1    Apr. 14, 2016

Related U.S. Application Data

(63) Continuation-in-part of application No. 14/736,551, filed on Jun. 11, 2015, now Pat. No. 10,188,192.

(Continued)

(51) Int. Cl.
*B05D 5/00* (2006.01)

(52) U.S. Cl.
CPC ................................. *B05D 5/005* (2013.01)

(58) Field of Classification Search
CPC ............ A45D 6140/162; A45D 44/005; A45D 34/04; A45D 2034/005; A45D 2004/007;
(Continued)

(56) References Cited

U.S. PATENT DOCUMENTS 5,160,315 A   11/1992   Heinecke
5,614,310 A    3/1997   Delgado
(Continued)

FOREIGN PATENT DOCUMENTS

FR     2933585 B1    10/2011
JP    2006297691 A   11/2006
(Continued)

OTHER PUBLICATIONS

U.S. Appl. No. 14/658,280, filed Mar. 16, 2015, Bush, et al.
(Continued)

*Primary Examiner* — Juanita D Jackson
(74) *Attorney, Agent, or Firm* — Abbey A. Lopez (57) ABSTRACT

A device and method for applying a material to a surface to repair, restore or refurbish at least a portion of the surface. The device has a sensor and one or more applicator nozzles. The device further includes a reservoir for containing a material to be deposited, and a CPU. The method includes providing information from the sensor about the surface to the CPU, which uses the information to identify where the material is to be deposited and/or how much to deposit.

12 Claims, 3 Drawing Sheets

Related U.S. Application Data (60) Provisional application No. 62/011,846, filed on Jun. 13, 2014.

(58) Field of Classification Search
CPC .... A45D 2200/057; H04N 7/18; A61B 5/442; A61B 5/4848; A61B 5/4839; A61B 5/444; A61B 5/0077; A61B 2560/0431

See application file for complete search history.

(56) References Cited

U.S. PATENT DOCUMENTS

| | | | |
|---|---|---|---|
| 6,139,829 | A | 10/2000 | Estrin |
| 6,305,046 | B1 * | 10/2001 | Kingry .................. A47L 13/256 15/228 |
| 6,312,124 | B1 * | 11/2001 | Desormeaux ................ 347/109 |
| 6,325,475 | B1 | 12/2001 | Hayes et al. |
| 6,398,358 | B1 | 6/2002 | Miyake |
| 6,461,467 | B2 | 10/2002 | Blatchford |
| 6,481,515 | B1 | 11/2002 | Kirkpatrick |
| 7,166,279 | B2 | 1/2007 | Law |
| 7,890,152 | B2 | 2/2011 | Edgar |
| 8,007,062 | B2 | 8/2011 | Edgar |
| 8,027,505 | B2 * | 9/2011 | Edgar .................. A45D 44/005 347/1 |
| 8,184,901 | B2 | 5/2012 | Edgar |
| 8,226,194 | B1 | 7/2012 | Bledsoe |
| 8,231,292 | B2 * | 7/2012 | Rabe et al. .................... 401/19 |
| 9,174,445 | B1 | 11/2015 | Prati et al. |
| 9,174,453 | B1 | 11/2015 | Dodd et al. |
| 9,211,356 | B2 | 12/2015 | Gruenbacher et al. |
| 9,211,980 | B1 | 12/2015 | Gruenbacher et al. |
| 10,188,192 | B2 * | 1/2019 | Rabe et al. ............ A45D 40/26 |
| 2004/0078278 | A1 | 4/2004 | Dauga et al. |
| 2004/0175347 | A1 | 9/2004 | Bissett |
| 2006/0210513 | A1 | 9/2006 | Luizzi |
| 2006/0275237 | A1 | 12/2006 | Bissett |
| 2007/0035815 | A1 | 2/2007 | Edgar |
| 2007/0049832 | A1 | 3/2007 | Edgar |
| 2007/0139508 | A1 | 6/2007 | Muyskens |
| 2007/0148120 | A1 | 6/2007 | Omura |
| 2007/0224158 | A1 | 9/2007 | Cassin |
| 2008/0194971 | A1 | 8/2008 | Edgar |
| 2008/0225068 | A1 | 9/2008 | Morino |
| 2009/0025747 | A1 | 1/2009 | Edgar |
| 2009/0141112 | A1 | 6/2009 | Bergman |
| 2010/0049039 | A1 | 2/2010 | Heehler |
| 2010/0224210 | A1 | 9/2010 | Rabe |
| 2014/0078229 | A1 | 3/2014 | Jackson et al. |
| 2015/0359315 | A1 | 12/2015 | Rabe et al. |
| 2015/0367013 | A1 | 12/2015 | Gruenbacher et al. |
| 2015/0367014 | A1 | 12/2015 | Gruenbacher et al. |
| 2015/0367016 | A1 | 12/2015 | Gruenbacher et al. |
| 2015/0367356 | A1 | 12/2015 | Gruenbacher et al. |
| 2015/0367364 | A1 | 12/2015 | Dodd et al. |
| 2015/0367370 | A1 | 12/2015 | Dodd et al. |
| 2015/0367373 | A1 | 12/2015 | Dodd et al. |
| 2015/0367641 | A1 | 12/2015 | Giusti et al. |
| 2015/0373840 | A1 | 12/2015 | Dodd et al. |

FOREIGN PATENT DOCUMENTS

| | | |
|---|---|---|
| WO | WO2001/60274 A2 | 3/2003 |
| WO | WO2006048243 A1 | 5/2006 |
| WO | WO2008/098234 A2 | 8/2008 |
| WO | WO2008/098235 A2 | 8/2008 |
| WO | WO2008/100878 A1 | 8/2008 |
| WO | WO2008/100880 A1 | 8/2008 |
| WO | WO2009/036876 A1 | 3/2009 |
| WO | WO2010/004526 | 1/2010 |
| WO | WO2010/004527 | 1/2010 |
| WO | WO2010/004528 | 1/2010 |
| WO | WO2010/004529 | 1/2010 |
| WO | WO2010/004530 | 1/2010 |
| WO | WO2010/004531 | 1/2010 |
| WO | WO2010/077703 | 7/2010 |
| WO | WO2010/083400 A2 | 7/2010 |
| WO | WO2010/083405 | 7/2010 |
| WO | WO2015191821 A2 | 12/2015 |

OTHER PUBLICATIONS

U.S. Appl. No. 14/855,653, filed Sep. 16, 2015, Gruenbacher, et al.
U.S. Appl. No. 14/855,662, filed Sep. 16, 2015, Gruenbacher, et al.
U.S. Appl. No. 14/855,677, filed Sep. 16, 2015, Gruenbacher, et al.
U.S. Appl. No. 14/966,231, filed Dec. 11, 2015, Gruenbacher, et al.
U.S. Appl. No. 14/950,214, filed Nov. 24, 2015, Gruenbacher, et al.
U.S. Appl. No. 14/968,177, filed Dec. 14, 2015, Bush, et al.
U.S. Appl. No. 14/968,215, filed Dec. 14, 2015, Bush, et al.
U.S. Appl. No. 14/968,279, filed Dec. 14, 2015, Bush, et al.
All Office Actions for U.S. Appl. No. 14/658,280.
All Office Actions for U.S. Appl. No. 14/855,653.
All Office Actions for U.S. Appl. No. 14/855,662.
All Office Actions for U.S. Appl. No. 14/855,677.
All Office Actions for U.S. Appl. No. 14/966,231.
All Office Actions for U.S. Appl. No. 14/950,214.
All Office Actions for U.S. Appl. No. 14/968,177.
All Office Actions for U.S. Appl. No. 14/968,215.
All Office Actions for U.S. Appl. No. 14/968,279.

\* cited by examiner

DEVICE AND METHODS FOR MODIFYING SURFACES

FIELD OF THE INVENTION

This invention relates to a device and method for applying materials and/or compositions to surfaces. The device and method can be used to precicely apply a desired amount of the material to a specific location on a surface to refurbish, repair and/or restore a surface.

BACKGROUND OF THE INVENTION

There are many reasons to apply materials to surfaces, including to clean, protect, and/or to modify surfaces, such as, for example floors, walls, counters, cabinets, appliances, fabrics, leather and other surfaces commonly found in homes and businesses. However, current application techniques tend not to be very precice, and thus, extra material is used which or the material is applied to areas other than the intended areas. This is especially true when the application is done in the home or by other than professionals. Attempts to develop or improve devices used in the application of materials to surfaces have been made, but have generally failed to garner widespread acceptance due to their size, complexity and/or cost, especially when intended for consumer rather than commercial use.

Accordingly, there exists a need for methods and apparatuses that can precicely apply materials to surfaces. In addition there is a need for such methods and devices that can be conveniently and effectively used by non-professional consumers to repair, refurbish and/or restore a portion of a surface, such as, for example to fill a crack or scratch, repair a defect or refurbish a damaged portion of the surface.

SUMMARY OF THE INVENTION

In order to address one or more of the outages of the prior art, the present invention provides the following device and methods:

A) An apparatus for applying a composition to a surface to repair, refurbish and/or restore the surface, the apparatus including: an applicator head comprising a microfluidic die having one or more applicator nozzles; a reservoir to hold the composition; a sensor; and a CPU; wherein the sensor is configured to sense at least a portion of the surface and provide the CPU with information about the surface, and wherein the CPU analyzes the information from the sensor to identify surface deviations, and the CPU activates the one or more applicator nozzles based on the surface deviations.

B) The apparatus of paragraph A, wherein the sensor senses variations in color, brightness, reflectance, refractance temperature, surface height, texture, material composition, or combinations thereof.

C) The apparatus of paragraphs A-B, wherein the sensor is a camera.

D) The apparatus of paragraphs A-C, wherein the microfluidic die includes a plurality of nozzles.

E) The apparatus of paragraphs A-D, wherein the microfluidic die includes a heating element or an electromechanical actuator.

F) The apparatus of paragraphs A-E, wherein the sensor is a color sensor and the sensor and the CPU is programmed to identify a $\Delta L_S$ value of plus or minus 1.5%, preferably plus or minus 1.0% even more preferably plus or minus 0.5%, of the background L.

G) The apparatus of paragraphs F, wherein the predetermined $\Delta L_S$ value is greater than 3, preferably greater than 2 and more preferably greater than 1.

H) The apparatus of paragraphs A-G, wherein the CPU is configured to activates the one or more nozzles to apply the composition to the surface where the surface deviations are located.

I) The apparatus of paragraphs A-H, wherein the CPU is configured to activate the one or more nozzles to apply the composition to the surface where the surface deviations are not located.

J) The apparatus of paragraphs A-I, wherein the CPU is configured to activate the one or more nozzles in a discontinuous deposition pattern.

K) The apparatus of paragraphs A-J, wherein the CPU is configured to activate the one or more nozzles in a continuous deposition pattern.

L) The apparatus of paragraphs A-K, wherein the number and or frequency of nozzles fired can be adjusted by a user of the apparatus.

M) The apparatus of paragraphs A-L where the one or more nozzles are disposed in an array that is a linear configuration, multiple rows, off-set, sine wave, curved, circular, or saw tooth arrangements.

N) A method of depositing a composition on a surface to repair, refurbish and/or restore at least a portion of the surface, the method comprising the steps of:
   identifying the surface needing to be repaired, refurbished and/or restored;
   providing a device having a sensor, a reservoir for the composition, a CPU, and at least one microfluidic die comprising at least one nozzle;
   locating the sensor over at least a portion of the surface;
   activating the sensor to acquire information about the surface;
   providing the acquired information to the CPU;
   instructing the CPU to calculate the location of one or more deviations on the surface;
   and
   activating the at least one nozzle to deposit the composition on the surface.

O) The method of paragraph N, including the additional step of sensing the surface after the composition has been deposited thereon.

P) The method of paragraphs N-O, wherein the sensor senses the surface for variations in color, brightness, reflectance, refractance temperature, surface height, texture, material composition, or combinations thereof.

Q) The use of a device including a sensor, a CPU, a reservoir and a microfluidic die to apply a composition to a surface to repair, restore and/or refurbish at least a portion of the surface.

R) The use of paragraph Q, wherein the surface is a surface selected from the group of: a floor, a wall, a counter top, an appliance, a window, furniture, tools, a screen, a fabric, a carpet, a floor covering, a textile, a painted surface, or combinations thereof.

S) The use of a device including a sensor, a CPU, a reservoir and a microfluidic die to apply a composition to a surface of a shoe to repair, restore and/or refurbish at least a portion of the surface.

T. The use of a device including a sensor, a CPU, a reservoir and a microfluidic die to apply a cleaning composition to a crack or scratch to repair, restore and/or refurbish at least a portion of the surface.

BRIEF DESCRIPTION OF THE DRAWINGS

While the specification concludes with claims particularly pointing out and distinctly claiming the present invention, it is believed the same will be better understood from the following description taken in conjunction with the accompanying drawing in which:

DETAILED DESCRIPTION OF THE INVENTION

The present invention may be understood more readily by reference to the following detailed description of illustrative and preferred embodiments. It is to be understood that the scope of the claims is not limited to the specific compositions, methods, conditions, devices, or parameters described herein, and that the terminology used herein is not intended to be limiting of the claimed invention. Also, as used in the specification, including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent basis "about," it will be understood that the particular values form another embodiment. All ranges are inclusive and combinable. All percentages and ratios used herein are by weight of the total composition, and all measurements made are at 25° C., unless otherwise designated.

The present apparatuses and methods, in their simplest form, are directed to the application of one or more materials or compositions to a surface. As used herein, the terms "material", "materials", "composition" and "compositions" are intended to be interchangeable and are intended to encompass any single material and any combination of materials, unless specifically restricted to any particular material or materials. The terms are not intended to limit the form of the materials, how the materials are provided or produced, or any specific characteristics of the material(s) or composition(s) unless specifically set forth and called out herein as an exception to this definition.

The present devices and methods may be used for any suitable purpose, including but not limited to one or more of the following: cleaning surfaces; coloring surfaces; filling cracks or other indentations such as scratches, dents or separations; killing mold, mildew or bacteria other living organisms; staining surfaces; deodorizing surfaces; protecting surfaces by applying one or more materials to the surface; treating surfaces with one or more materials to change a property of the surface, such as hydrophobicity; removing stains; fixing weak or broken portions of the surface; changing the surface texture; restoring the surface; applying perfume to the surface; adding material to the surface that will chemically or otherwise react (e.g. light, heat, sound, etc.) as desired to the surface or other materials that are subsequently applied to the surface or to which the surface is exposed.

Exemplary surfaces and substrates for the application of the treatment composition by the present deposition system include ceramics; grouts; plastics; manufactured surfaces such as quartz countertops; painted surfaces; glass; carpeting; tiles; wood or other natural surfaces; fibers; woven surfaces; non-woven surfaces; leather and other treated organic materials; concrete; non-porous surfaces; metals; and combinations thereof.

Method

The specific method used to apply the desired material to the target surface will vary with the particular desired use and outcome. However, certain steps will be generally applicable to various embodiments of the present invention. The following examples are intended to be non-limiting and it is fully contemplated that additional steps or alternative steps may be included when appropriate.

One non-limiting example of the method of the present invention that could be used to apply a specific material to a certain location on a surface includes the steps of taking at least one background image of at least 10 µm² of surface and then calculating the average background L value of the image on a grey scale. The background L can be calculated anywhere within the image. The background L can be the arithmetic average, median, or mean of a plurality of local Ls, which means the calculation can include all of the local Ls in the image, or a subset thereof. Further, from the same image, a localized L value is calculated for individual pixels or a group of pixels. The local L value is then compared to the background L value to identify color deviations. A color deviation is an area of the surface where the absolute value of the difference between a local L value and the background L, (this difference being defined as "$\Delta L_M$" or the measured $\Delta L$, "$\Delta$" is commonly defined as the symbol for a difference between two values) is greater than a predetermined $\Delta L_S$. The background L can be preset, or calculated by a variety of methods described below. A material can then be applied to the locations of the color deviations to reduce or increase the color deviation or otherwise apply a particular material to the specific portions of the surface desired.

The predetermined $\Delta L_S$ is the absolute value of the difference between the local L and the background L. This value, $\Delta L_S$, can be defined in absolute numbers or as a percentage. The images are taken, or converted to a standard grey scale that is known to the art. It is understood that any numerical scale that measures lightness to darkness can be considered a "grey scale". Moreover, as used herein, "grey scale" is intended to be a linear scale, or one band, or one visual attribute. For example, one "grey scale" visual attribute could be single wavelength or a narrow wavelength to define a specific visual color. Another example of one "grey scale" visual attribute could be a mix of wavelength numerical values averaged for each pixel making up the image, such as a true black, grey or white image from an RGB mixture.

It will also be understood to those skilled in the art that the background L value should not be too close to the ends of this scale. For example, if the grey scale is 0-100, with 0 being pure black and 100 being pure white, a background in the 0-10 range, or in the 90-100 range may be too light or too dark to show meaningful differences. Accordingly, one can adjust the background lighting, or the gain on the camera taking the image, to move the background L closer to the middle of the scale. In this example, a background L of 50 would work well, with a background L in the range of 10-90 or 20-80 being even more preferred.

The most common grey scale is 0-255 (no units) and other examples include 0-1024 and 0-4096. For a grey scale of 0-255, the difference between grey scale steps is at least 1/255. In this example it would be desirable to use camera and lighting settings that provide a background L value between 60 and 210. Using the 0-255 gray scale the $\Delta L_S$ is preferably at least 0.5, at least 1 or at least 1.5 to initiate deposition of the material on the surface. Likewise, $\Delta L_S$ can be measured as a percentage, for example, a numerical $\Delta L_S$ of 2.6 is approximately equal to 1.0% of a 255 grey scale. Thus, $\Delta L_S$ may be plus or minus 0.25%, plus or minus 0.5%, or plus or minus 0.75%, of the grayscale.

Images may be taken in sequence or preferably continuously. Higher speed cameras, cameras that capture greater than 4 frames per second, greater 100 frames per second, greater than 200 frames per second, and even greater than 600 frames per second may be desired for certain applications. The images are preferably either taken in a grey scale or converted to a grey scale. The grey scale can have any range, for example, 0-255, no units. This corresponds approximately to a refresh rate of 0.2 seconds or faster. Consistent with the camera, it may be desirable to choose a CPU that can process the images at a rate that is at least that of the rate the images are captured.

There is no technical difference between an image used for background L values and those used for local L values, the difference is in the analysis of the image. Hence, the images are continually sent to the CPU, that is, the processing unit, to calculate the L values, and $\Delta L_M$ values. By "sent" it is understood, that preferably at least 4 bits of data per pixel are transferred for each image, and preferably, this 4 bit (or more) packet of data is used in the calculation of each local L value. It is understood, that the background L can be calculated once in a treatment period and that value reused throughout the treatment period. Or it can be continually recalculated as long as the treatment process goes on. Moreover, there can be pre-programmed triggers to initiate a recalculation of the background L. Also, the background L may be retrieved from the CPU memory to be used for the current background L. For example, if an extended period of time elapses and no skin deviations are found, or if skin deviations are being found too frequently, a new background L might automatically be calculated. Likewise, $\Delta L_S$ can be a set value that remains constant throughout the treatment cycle or it too can vary. $\Delta L_S$ can be reset during the treatment cycle for any of a variety of reasons. If too many nozzles are firing too frequently, the $\Delta L_S$ can be adjusted to lower the intensity of the nozzle firing. Similarly, if the nozzles are firing too infrequently, $\Delta L_S$ can be adjusted in the opposite direction to increase the sensitivity of skin deviation detection. Those skilled in the art will appreciate that modifying $\Delta L_S$ during treatment is a matter of programming the CPU to or with a desired algorithm.

When the $\Delta L_M$ exceeds the predetermined value, a material may be applied to the deviation. Specifically, one or more of the nozzles which dispense the composition is fired in the area of the skin deviation. The composition may be applied to surface in a continuous or discontinuous deposition pattern. The composition or materials can be applied to the surface by scanning and applying at the same time and/or while making multiple passes over the surface. Several advantages result from using multiple pass application. The process for multiple pass applications is to make a partial application of the composition, then to scan again the area of surface that has received the partial application. A further application of compositions can be made, and still further multiple pass scanning and applications can be made to approach a specific goal. Thus, the consumer can select the end point of the application, thus tailoring the application time to individual needs and preferences.

The method described above can also be used to identify surface irregularities such as cracks, dents, openings, imperfections, etc. Once identified, the areas of deviation can have a material applied thereto to provide the desired end result. For example, a crack in a tile may be filled, caulk may be applied to an opening between construction materials, grout may be applied to the space between tiles, wood filler may be applied to a dent in a wood floor or a material may be applied to a scratch or dent in a painted surface to fill, repair, and/or hide the imperfection. In other situations, the method may be used to identify stains in fabrics and to apply cleaning agents or hueing dyes. Still other uses for the method can be to apply sealing materials, pigments, antibacterial agents, perfumes, masking agents, or any other desired material to a specific portion of a surface.

Device

A non-limiting example of the device of the present invention is a hand-held device that includes a sensor and an applicator. The applicator may include one or more nozzles and a reservoir for containing the composition to be applied to the desired surface. The device may also include an optional illumination source and a CPU. The illumination source can illuminate the surface to be sensed and the sensor can sense information from the surface that is used to determine how much material is applied to the surface and where. In a simple example, the device may include a sensor that records an image of the surface, a CPU to analyze the image to determine where and how much material is to be deposited on the surface and an applicator to apply the desired amount of the material to the desired location on the surface.

The sensor may used to sense any number of attributes of the surface to which the material is to be applied. The sensor may be, for example, a camera that takes black and white or color images, a spectrophotometer or similar devices that are sensitive to electromagnetic energy wavelengths. The sensor output may be used to calculate the localized L value of individual pixels or groups of pixels of the surface. The CPU can then compare the local L value to the background L value to identify surface deviations where the difference between the two L values is greater than a predetermined value. The sensor readings may include, but are not limited to values selected from the group of color, brightness, reflectance, refractance temperature, texture, depth, width, length, odor, and mixtures thereof.

The central processing unit ("CPU") of the device can be any of a variety of commercially available devices. In its simplest form, the CPU is a single programmable chip like those found in consumer electronic devices such as a lap top computer, a cell phone, an electric razor and the like. Those skilled in the art will know of a variety of commercially available chips and other processors suitable for use with this invention. CPU may include Application Specific Integrated Circuit (ASIC), controller, Field Programmable Gate Array (FPGA), integrated circuit, microcontroller, microprocessor, processor, and the like. The CPU may also include memory functionality, either internal to the CPU as cache memory, for example Random Access Memory (RAM), Static Random Access Memory (SRAM) and the like or external to the CPU for example as Dynamic Random-Access Memory (DRAM), Read Only Memory (ROM), Static RAM, Flash Memory (e.g., Compact Flash or SmartMedia cards), disk drives, Solid State Disk Drives (SSD) or even Internet Cloud storage. While it is anticipated that a remote CPU, either tethered to the device, or which communicates wirelessly, can be used to accomplish the methods of the present invention, a local CPU within the device is exemplified herein. The appropriate size and speed of the CPU may be determined based on the particular desired uses of the device.

The applicator of the device may be any applicator that can provide for precision delivery of the material to the surface. For example, microfluidic dies may be used alone or in combination with other technologies. The term "microfluidic die", as used herein means a die comprising a fluid injection system made using a semiconductor micro fabrication process such as thin film deposition, passivation, etching, spinning, sputtering, masking, epitaxy growth, wafer/wafer bonding, micro thin-film lamination, curing, dicing, etc. These processes are known in the art to make MEMs devices. Microfluidic dies may be made from silicon, glass, or a mixture thereof. The microfluidic die comprises a plurality of microfluidic chambers, each comprising a corresponding actuation element: a heating element or an electromechanical actuator. In this way, the microfluidic die's fluid injection system may be micro thermal nucleation (e.g. via heating element) or micro mechanical actuation (e.g. via thin film piezoelectric or ultrasonics). One type of microfluidic die suitable for the microfluidic delivery system of the present invention is an integrated membrane of nozzles obtained via MEMs technology as described in U.S. 2010/0154790, assigned to STMicroelectronics S.R.I., Geneva, Switzerland. In the case of thin film piezo, the piezoelectric material is typically applied via spinning and/or sputtering processes. The semiconductor micro fabrication process allows one to simultaneously make one or thousands of MEMS devices in one batch process (a batch process comprises of multiple mask layers). The microfluidic delivery member includes a die having a fluid chamber with an inlet and an outlet.

While microfluidic dies and inkjet-like cartridges are shown and exemplified herein, compositions may be applied with other "flow control" devices or non-drop control devices. Flow control devices typically are characterized as "drop control devices" where individual droplets of the substance are controlled. Examples of drop control include "fine flow control" where the flow of the substance is precisely controlled to deliver droplets as desired and "inkjet technologies." An older inkjet technology includes supplying a continuous flow of charged droplets past electrostatic deflector plates which are alternately charged so that the plates either permit a droplet to pass or deflect to a gutter. This technique was the original design basis for inkjet printers. Other inkjet technologies include "drop on demand" such as thermal devices provided by Hewlett Packard, and piezoelectric devices such as provided by Epson and other printer manufacturers. Drop on demand technology may also be combined with charging the droplets.

Other suitable devices for depositing the materials include, but are not limited to, piezo electric drop control devices and other micro electromechanical systems. Yet other spray devices, including electrostatic spray devices, that are non-drop control devices may be used, but since they tend not to provide the desired control of the material to be deposited they may not be suitable for all applications of the technology. However, in certain circumstances, they may be useful to be used alone or in combination with other technologies. For example, such technologies can provide some "randomness" to the deposition of the material, which may be desired in order to produce a smooth application over a relatively large area. However, because the general intent of the present invention is to allow a user to provide very specific control of the amount and/or placement of the compositions on the target surface, these technologies may not be suitable for every contemplated use of the present invention.

In devices including one or more nozzles, the composition may be dispensed by "firing" one or more of the nozzles when the nozzles are located adjacent the surface deviation or other identified region for application of the composition. By "firing" it is meant that the composition is forced through the nozzle. The composition may be applied to surface in a continuous or discontinuous deposition pattern via one or more nozzles. Where multiple nozzles are used, they may be disposed in an array. The "array" can be a linear configuration, multiple rows, off-set, sine wave, curved, circular, saw tooth arrangements, or any other desired arrangement of the nozzles. The number and location of nozzles as with the frequency of their firing can be static or can be adjustable. Those skilled in the printing arts will appreciate the various configurations of nozzle arrays that are possible for use in the methods and apparatuses disclosed herein.

Firing intensity curves can be programmed into the CPU to adjust the firing rate of nozzles. For example, if $\Delta L_M$ is equal to or slightly greater than $\Delta L_S$, then the adjacent nozzle is fired 1 time. If $\Delta L_M$ increases to $2*\Delta L_S$, then the adjacent nozzle is fired 25 times. If the $\Delta L_M$ is $3*\Delta L_S$, then the adjacent nozzle is fired 100 times. This non-limiting example is intended to show how the size of the $\Delta L_M$ with respect to the $\Delta L_S$ can determine the amount, and hence, the intensity of the firing of the nozzles. Those skilled in the art will appreciate that plotting a firing intensity curve using 2, 3 or more data points, and then programming that firing intensity curve into the CPU are known techniques.

Exemplary equipment that could be useful in constructing an apparatus of the present invention is described in the following published patent applications: WO 2008/098234 A2, Handheld Apparatus and Method for the Automated Application of Cosmetics and Other Surfaces, filed 11 Feb., 2007; WO 2008/100878 A1, System and Method for Applying a Treatment composition to Change a Person's Appearance Based on a Digital Image, filed 12 Feb., 2007; WO 2008/098235 A2, System and Method for Providing Simulated Images Through Cosmetic Monitoring, first filed 11 Feb., 2007; WO 2008/100880 A1, System and Method for Applying Agent Electrostatically to Human Skin, filed 12 Feb., 2007; US 2007/0049832 A1, System and Method for Medical Monitoring and Treatment Through Cosmetic Monitoring and Treatment, filed 12 Aug., 2005; and US 2007/0035815 A1, System and Method for Applying a Treatment composition to Improve the Visual Attractiveness of Human Skin, filed 12 Aug., 2005; U.S. Ser. No. 14/736,551 entitled Apparatus And Methods For Modifying Keratinous Surfaces, filed Jun. 11, 2015.

Compositions

The present invention may utilize any desired composition, material or mixture of compositions or materials. For example, the composition may include inks, dyes, pigments, adhesives, curable compositions, optically activated compounds, metal oxides, bleaching agents, texture reducing polymers, silicones, stains, paints, surfactants, cleaners, malodor reducing agents, lubricants, fillers, perfumes, scents, polymers, polymeric additives, particles, optical modifiers, optical matchers, and other actives such as antibacterial and antimicrobials, and combinations of these or other materials, some of which are further described herein.

The composition can be delivered in a variety of product forms including, but not limited to, a cream, a lotion, a gel, a foam, a paste, particles, liquid, mixture, or a serum and may be applied as a single phase or material or as multiple phases or multiple materials. Additionally, the composition can include for stabilizers or other processing and/or preservative ingredients.

Additionally, the compositions can be delivered alone or in the presence of a carrier. The carrier, if any, can be in a wide variety of forms. Non-limiting examples include simple solutions (water or oil based), emulsions, and solid forms (gels, sticks, flowable solids, wax, amorphous materials). In certain embodiments, the carrier is in the form of an emulsion. Emulsion may be generally classified as having a continuous aqueous phase (e.g., oil-in-water and water-in-oil-in-water) or a continuous oil phase (e.g., water-in-oil and oil-in-water-in-oil). The oil phase of the present invention may comprise silicone oils, non-silicone oils such as hydrocarbon oils, esters, ethers, and the like, and mixtures thereof. For example, emulsion carriers can include, but are not limited to, continuous water phase emulsions such as silicone-in-water, oil-in-water, and water-in-oil-in-water emulsion; and continuous oil phase emulsions such as water-in-oil and water-in-silicone emulsions, and oil-in-water-in-silicone emulsions. Other carriers or chassis include humectants, one example of which is a polyhydric alcohol. Exemplary polyhydric alcohols include polyalkylene glycols and alkylene polyols and their derivatives, including propylene glycol, dipropylene glycol, polypropylene glycol, polyethylene glycol and derivatives thereof; sorbitol; hydroxypropyl sorbitol; erythritol; threitol; pentaerythritol; xylitol; glucitol; mannitol; butylene glycol (e.g., 1,3-butylene glycol); pentylene glycol; hexane triol (e.g., 1,2,6-hexanetriol); glycerin; ethoxylated glycerine; and propoxylated glycerine. Yet other humectants include sodium 2-pyrrolidone-5-carboxylate, guanidine; glycolic acid and glycolate salts (e.g., ammonium and quaternary alkyl ammonium); lactic acid and lactate salts (e.g., ammonium and quaternary alkyl ammonium); aloe vera in any of its variety of forms (e.g., aloe vera gel); hyaluronic acid and derivatives thereof (e.g., salt derivatives such as sodium hyaluronate); lactamide monoethanolamine; acetamide monoethanolamine; urea; sodium pyroglutamate, water-soluble glyceryl poly(meth)acrylate lubricants (such as Hispagel®) and mixtures thereof.

Non-Limiting Examples

Figure 1:
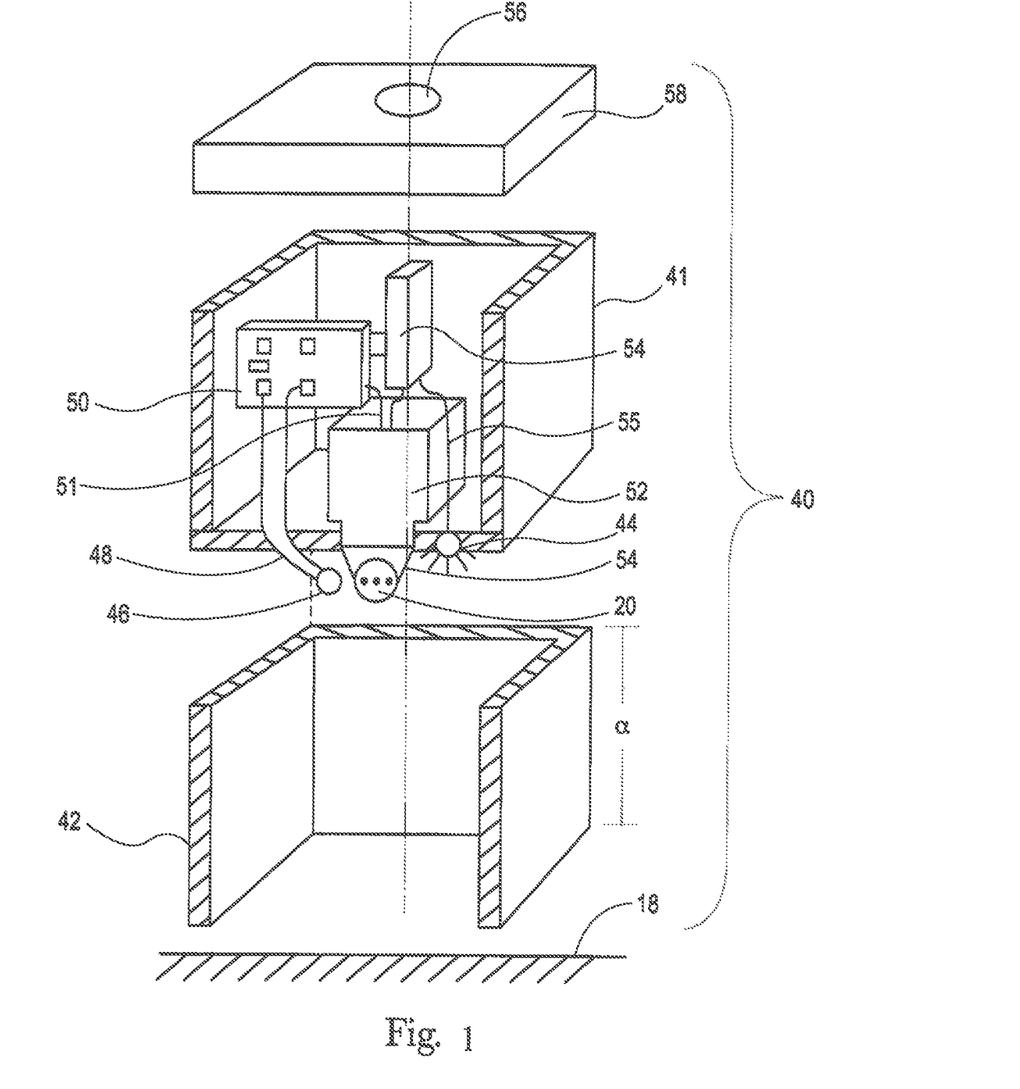
FIG. 1 is an exploded view of a hand held apparatus according to the present invention.

FIG. 1 shows an exploded view of an example of a handheld apparatus or device 40 according to the present invention. Apparatus 40 is shown directly above surface 18, separated by physical spacer 42. Physical spacer 42 may be a portion of the device 40 or may be a separate piece that may be used to help the user locate the device above the surface 18. As shown, the spacer 18 has a set, predetermined height α such that when it contacts surface 18, but it is contemplated that the spacer may be adjustable or that different spacers could be used for different purposes. The spacer 18 helps the user maintain the mechanical and electrical elements above the surface are all at a known distance from the surface.

The mechanical and electrical elements associated with apparatus 40 include, but may not be limited to, light 44, image capture device 46, nozzle array 20 (which is shown embedded on cartridge die 54) which is shown attached to cartridge 52. Preferably, all of these elements are enclosed within optional apparatus housing 41, although other embodiments are contemplated wherein one or more of the elements are located outside housing 41. Light 44 illuminates an area of the surface 18 such that the image capture device 46 has relatively constant illumination. In situations where background lighting could affect the image capture, the spacer 42 prevent background light in and/or the illumination from light 44 to escape. Generally, however, small deviations in illumination can be corrected for provided light 44 provides a relatively constant background illumination. Light 44 can be a light emitting diode (LED), incandescent light, neon bulb based or any other commercially available source of illumination. Light 44 can have constant illumination or adjustable illumination. For example, an adjustable light source might be useful if the background illumination is excessively bright or dark.

Image capture device 46 can be any of a variety of commercially available devices such as a simple camera or a digital cmos camera chip. Image capture device 46 takes a picture of surface 18 and sends it to processor 50 via image capture line 48 for analysis. Alternatively or additionally, the device 40 may include sensors other than the image capture device. For example, it may be desirable to sense the texture of a surface, the color of a surface, materials on a surface, the friction of a surface or other physical and/or aesthetic features. Sensors available for sensing any desired property of the surface can be used with the device 40. The information sensed by the sensor can be provided to the processor 50.

Processor 50 is generally referred to as a central processing unit, or CPU, which may comprise a simple circuit board, a more complex computer, or the like and may include memory functionality. Those skilled in the art will appreciate that a CPU can be any of wide variety of commercially available programmable devices.

If an image capture device 46 is used, the image may be analyzed for local L values, background L values, both or other values consistent with the particular use of the device 40. Grey scale conversion occurs within the analytical processing capabilities of processor 50. The comparison of background L to local L to determine the $\Delta L_M$ occurs within processor 50, which can be a commercially available programmable chip, or other commercially available processing units. The results of the image analysis, when compared to criteria pre-programmed into the processor, may result in a desired application of a material to the surface. In such a case, for example when the calculate $\Delta L_M$ exceeds the pre-determined $\Delta L_S$, a signal is sent from processor 50 to cartridge 52, via cartridge line 51, to fire one or more of the nozzles in nozzle array 20.

Power for cartridge 52, light 44, image capture device 46, processor 50, and other mechanical and electrical elements that might be present is supplied by power element 54 via multiple power lines 55. Power element 54 can be turned off and on, which in turn turns apparatus 40 off and on, via power switch 56 which can be located anywhere on apparatus 40, but is shown here on apparatus cover 58. Power element 54 may include energy storage functionality via a battery, a rechargeable battery, an electrochemical capacitor, a double-layer capacitor, a supercapacitor or a hybrid battery-capacitor system.

Figure 2:
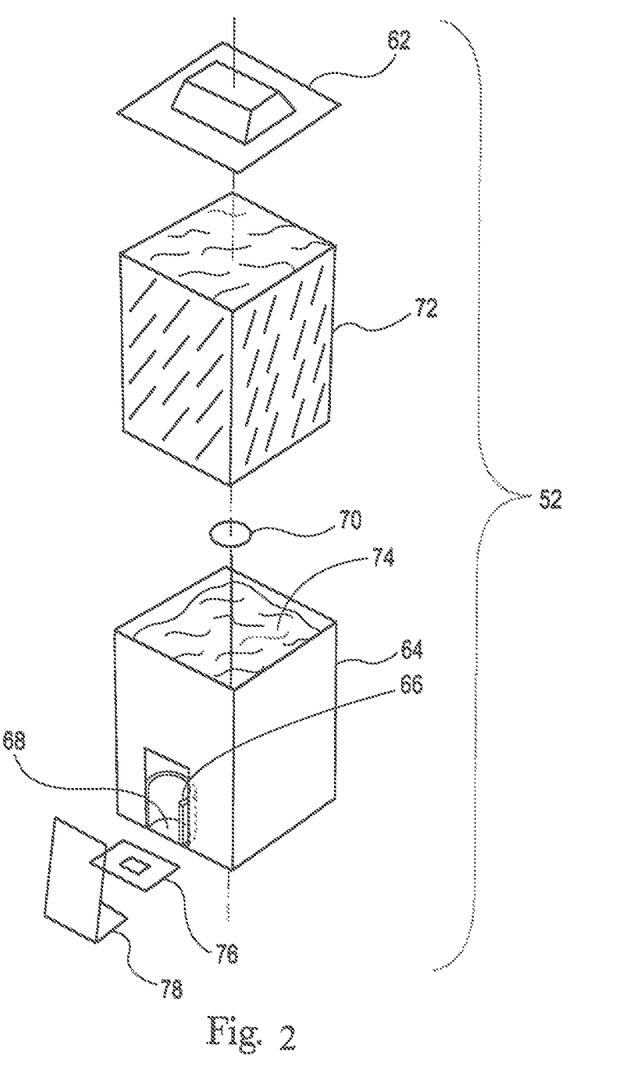
FIG. 2 is an exploded view of a cartridge that may be used with the device of the present invention.

Turning now to FIG. 2, an exploded view of cartridge 52 is shown. The cartridge 52 includes cartridge cap 62 and cartridge body 64. Body 64 includes standpipe 66 which is typically enclosed within body 66 and defines nozzle outlet 68. Optional filter 70 helps keep excessively large particles, and other debris out of the nozzle array 76. Filter 70 and nozzle array 76 are shown on opposite sides of nozzle outlet 68, although other configurations are contemplated. Composition 74 partially fills cartridge body 64. Core 72 fills cartridge 64 and helps to regulate back pressure of the composition 74. Core 72 may be a sponge, foam, fibrous material, paper or any other material suitable for the desired operation. Back pressure can be regulated via bladders and/or other methods known to the art. The core 72 shown is just one example of how to help regulate flow of the composition 74 to standpipe 66 through filter 70 and into nozzle array 76. Connector 78 provides the electrical power and signal to nozzle array 76. Composition 74 may be ejected from the cartridge 52 by piezoelectric means, thermal means, mechanical pumping means or a combination of these or others know and/or set forth herein.

Figure 3:
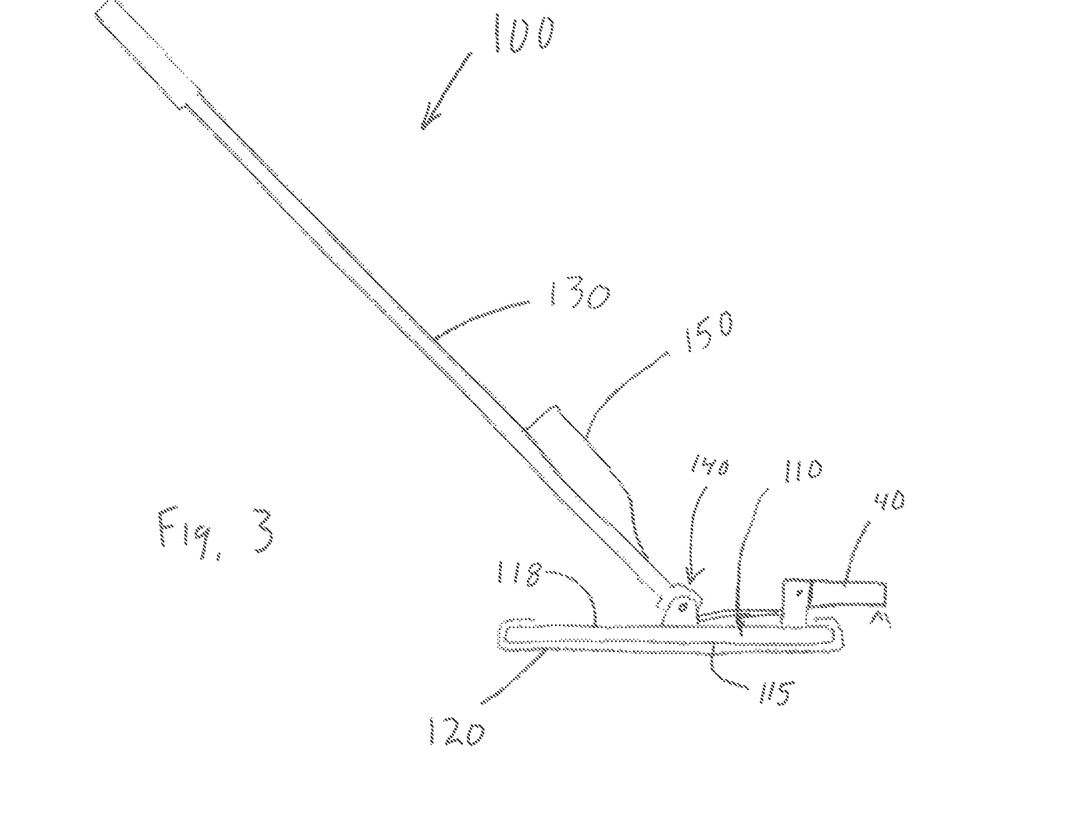
FIG. 3 is a side view of an example of the device of the present invention mounted on a cleaning implement.

The device or apparatus of the present invention may be configured to be held in the hand of a user or can be mounted to a structure that allows the user to more easily move the apparatus across the surface to be modified, an example of which is shown in FIG. 3. In either case, during use, the consumer can simply move the apparatus across the surface to be treated. Optionally, the device can be configured in a stationary structure wherein the consumer moves the surface to be treated across the device. Embodiments are also contemplated where more than one device is used. In such configurations, similar devices can be used in parallel or in series. In other configurations, different devices can be combined together.

If the device 40 according to the present invention is used with a cleaning implement, the cleaning implement may include any known structure. For example, the cleaning implement may be a wet or dry mop, a vacuum, a squeegee or any other implement. One exemplary embodiment is shown in FIG. 3. The implement 100 includes a plastic head 110 for holding the cleaning sheet 120 and an elongate handle 130 articulably connected thereto. The handle 130 may comprise a metal or plastic tube or solid rod. The head 110 may have a downwardly facing surface 115, to which the sheet 120 may be attached or against which the sheet 120 may be located. The downwardly facing surface 115 may be generally flat, or slightly convex. The head 120 may further have an upwardly facing surface 118. As shown in FIG. 3, the sheet 120 may be attached to the upwardly facing surface 118 and wrap around at least a portion of the downwardly facing surface 115 of the head 110. The upwardly facing surface 118 may have a universal joint 140 or the like to facilitate connection of the elongate handle 130 to the head 110. The device 40 of the present invention may be mounted to the head 110 of the implement 100, the handle 130 or any other portion of the implement 100.

A hook and loop system may be used to attach the cleaning sheet 120 directly to the bottom of the head 110. Alternatively, the upwardly facing surface 118 may further comprise a mechanism, such as resilient grippers, for removably attaching the cleaning sheet 120 to the implement 100. If grippers are used with the cleaning implement, the grippers may be made according to commonly assigned U.S. Pat. Nos. 6,305,046; 6,484,346; 6,651,290 and/or D487,173.

The cleaning implement 100 may further comprise a reservoir 150 for storage of a cleaning solution or other composition. The reservoir 150 may be replaced when the cleaning solution is depleted and/or refilled as desired. The reservoir 150 may be disposed on the head or the handle of the cleaning implement. The neck of the reservoir may be offset per commonly assigned U.S. Pat. No. 6,390,335. The cleaning solution contained therein may be made according to the teachings of commonly assigned U.S. Pat. No. 6,814,088.

If a cleaning sheet 120 is used, it may comprise a nonwoven. The nonwoven may be synthetic and/or have cellulosic fibers therein. The synthetic fibers may comprise carded, staple, wet laid, air laid and/or spunbond fibers. The cleaning sheet 120 may comprise layers, to provide for absorption and storage of cleaning fluid deposited on the target surface. If desired, the cleaning sheet 120 may comprise absorbent gelling materials to increase the absorbent capacity of the cleaning sheet. The absorbent gelling materials may be distributed within the cleaning sheet in such a manner to avoid rapid absorbency and absorb fluids slowly, to provide for the most effective use of the cleaning sheet.

The cleaning sheet 120 may comprise plural layers disposed in a laminate. The lowest, or downwardly facing outer layer, may comprise apertures to allow for absorption of cleaning solution therethrough and to promote the scrubbing of the target surface. Intermediate layers may provide for storage of the liquids, and may comprise the absorbent gelling materials. The cleaning sheet 120 may have an absorbent capacity of at least 10, 15, or 20 grams of cleaning solution per gram of dry cleaning sheet, as set forth in commonly assigned U.S. Pat. Nos. 6,003,191 and 6,601,261. The top, or upwardly facing outer layer, maybe liquid impervious in order to minimize loss of absorbed fluids. The top layer may further provide for releasable attachment of the cleaning sheet to a cleaning implement. The top layer may be made of a polyolefinic film, such as LDPE.

The device of the present invention may also be or be associated with a duster or other surface cleaning device. In one such embodiment, the device may include sole plate with a permanent cleaning surface and a removable/replaceable cleaning surface. The replaceable cleaning surface may comprise a pad. The device may also include a replaceable, on-board supply of cleaning solution. The pad/cleaning solution may be replaced when depleted and replaced with a new pad/cleaning solution or may simply be replaced with a new pad/cleaning solution which may be more suitable for a particular cleaning task.

In use, application times will vary based on the size of the application area and the precision and amount of the material that is desired to be applied. For example, a user may wish to simply touch up a small scratch on a surface and the application might take just a few seconds or minutes. Alternatively, a user may wish to restore the look of an entire counter top. This type of application could take minutes or hours. Accordingly, the consumer will have tremendous control over how and for what the device and process is used. Further, to ensure the nozzles do not clog, it may be desirable to fire nozzles periodically to keep them clean or clear.

Exemplary Uses

Color:

The method and device of the present invention may be used to provide and/or modify the color, reflectance or other aesthetic features of a surface. For example, it may be desirable to add color to a portion of a surface. It may be desirable to do so in order to change the color of that portion of the surface, restore the original color of the surface, mask a color or other feature of a surface, such as, for example, a defect or discoloration. As such, it may be desirable to provide a composition or mixture of compositions that include color, hue, pigment or other materials. Examples of such compositions include, but are not limited to inks, dyes, metal oxides and pigments (collectively referred to herein as "colorants"). Colorants may include inorganic or organic pigments and powders. Organic pigments can include natural colorants and synthetic monomeric and polymeric colorants. Organic pigments include various aromatic types such as azo, indigoid, triphenylmethane, anthraquinone, and xanthine dyes which are designated as D&C and FD&C blues, browns, greens, oranges, reds, yellows, etc. Organic pigments may consist of insoluble metallic salts of certified color additives, referred to as the Lakes. Inorganic pigments include iron oxides, ferric ammonium ferrocyanide, manganese violet, ultramarines, chromium, chromium hydroxide colors, and mixtures thereof. The pigments may be coated with one or more ingredients that cause the pigments to have desired characteristics, such as hydrophilicity or hydrophobicity. Exemplary coating materials include silicones, lecithin, amino acids, phospholipids, inorganic and organic oils, polyethylene, and other polymeric materials. Exemplary silicone treated pigments as disclosed in U.S. Pat. No. 5,143,722. Inorganic white or uncolored pigments include $TiO_2$, $ZnO$, $ZrO_2$, hollow spheres or semiconductor quantum dots, which are commercially available from a number of sources. Other suitable colorants are identified in U.S. Pat. No. 7,166,279.

Adhesives:

Adhesives can be applied to surfaces with the device and method of the present invention. It may be desirable to apply the adhesive to the surface alone or to apply the adhesive with or in anticipation of another material that will stick to the adhesive. Examples of adhesives include those described, for example, in U.S. Pat. No. 6,461,467, issued to Blatchford, et al., filed on Apr. 23, 2001; U.S. Pat. No. 5,614,310, issued to Delgado, et al., filed on Nov. 4, 1994; and U.S. Pat. No. 5,160,315, issued to Heinecke et al., filed on Apr. 5, 1991.

As noted above, after an adhesive is applied to a surface, a second composition may be applied to the surface and/or adhesive. In one embodiment, the second material that is not adhered to the adhesive can be removed leaving behind a selective, micro application of the second material to the surface.

Activatable Materials:

Compositions that cure or are otherwise activated upon exposure to certain wavelengths of energy, infrared light or UV for example, are know to the art and can be applied by the device and method of the present invention. For example, a light curable composition may be selectively applied to the surface and then cured by exposing the surface to the curing energy source. The entire surface can be exposed to the activation source or the exposure can be done by the device at the same time as the application and selectively to the material that is applied to the surface.

An example of an activatable material is one that includes optically-activated particles. Such materials are sometimes referred to a "interference pigments". They often include a plurality of substrate particles selected from the group consisting of nylons, acrylics, polyesters, other plastic polymers, natural materials, regenerated cellulose, metals, hollow spheres, semiconductor quantum dots and minerals; an optical brightener chemically bonded to each of the plurality of substrate particles to form integral units in the form of optically-activated particles for diffusing light. These materials can help to reduce the visual perception of imperfections, including dents, scratches, cracks, and discolorations. The optically-activated particles may be encapsulated with a UV transparent coating to increase the diffusion of light to further reduce the visual perception of the imperfections. Such encapsulated optically-activated particles are able to absorb ultraviolet radiation and emit visible light as well as scatter and absorb light in a diffuse manner in order to reduce the visual perception of the imperfections.

Fillers:

The method and device of the present invention may be used to fill depressions in surfaces such as cracks, dents, slits, openings and the like. For example, the device and method may be used to fill cracks in wood floors, tiles, lenses, countertops, pavement, walls and other hard surfaces. Additionally, the method and device may be used to fill crack or the like in flexible surfaces such as leather, plastics, fabrics, films, foils and the like. Examples of compositions that can be used for such purposes include the aqueous oil-in-water emulsion scratch cover composition for finished wood disclosed in WO 1994010237 A1; the compositions for fixing wood floor scratches disclosed in US 2011/189387; the curable filler composition for veneer repair disclosed in US 2008/0152876; the compositions in U.S. Pat. No. 8,128,718; the solid polishing materials disclosed in U.S. Pat. No. 5,334,335; those set froth in U.S. Pat. Nos. 5,082,691; 5,821,291 and WO 9607706. Other fillers include urethane prepolymer with an isocyanate group at the terminal and obtained by reacting polyole including polytetramethyleneglycol and/or modified polytetramethyleneglycol with a polyisocyanate compound as described in more detail in JP 5106801.

In these types of uses, it may be desirable for the device to sense changes in the tropography of the surface in order to determine where to apply the material. However, it would also be possible to use color changes, such as the L value changes set forth herein to determine where to apply the composition and how much, etc. It may even be desirable to combine topography sensing with color sensing to ensure the target area is accurately identified and/or appropriately modified by the applied composition.

Pills—Carezyme

The present method and device may also be used to help prevent and/or remove pills from fabric. Compositions that may be used with the present invention include, but are not limited to those that include from about 0.25% to about 50%, from about 0.5% to about 25%, from about 0.75% to about 15%, or from about 1% to about 10% of solublizing agent. The Solubilizing agent may be selected from the group consisting of solvent, emulsifier, surfactant, fabric softener active and mixtures thereof. Preferably the solvent is present in the range of 0.25% to 50%, 1% to 20%, or 2% ot 10%. Prefererably, the emulsifier is present in the range of 0.1% to 10%, 0.5% to 5%, 0.1 to 35%, 1% to 25%, or 1.5% to 20%. Preferably the active is present in the range of 1% to 35%, 2% to 20%, or 3% to 10%.

Color Restoration:

The method and device of the present invention may also be used to restore colors to surfaces such as fabrics and hard surfaces. Examples of compositions that can be used for color restoration include those set forth in the following patents as US 200924562; WO 2010025097; US 20080242584; US 20110177994; US 2008/0242584A1; U.S. Ser. No. 00/906,906; US 200906907; US 2009088363; US 2009209445; U.S. Pat. Nos. 8,003,589; 8,188,026; 8,236,745; 8,357,648; US 2009249562; U.S. Pat. No. 8,097, 047; US 2012246840; US 200917811; US 200917812; WO 8084460; WO 8084461; US 2010056419; US 201005642; US 2010056421; US 201129661; U.S. Pat. Nos. 8,193,141; 8,372,795; 8,193,141; 8,969,281, and in the example, below.

| Component Material | I | II | III | IV | V | VI | VII | VIII | IX | X | XI |
|---|---|---|---|---|---|---|---|---|---|---|---|
| AE3S NH4[1] | 2.0 | — | 3.0 | — | — | — | — | — | — | — | 2.0 |
| AE 1.8S[2] | — | 5.0 | — | 3.0 | 2.0 | — | — | — | — | 5.0 | — |
| HLAS[3] | — | — | — | — | — | 3.0 | 5.0 | 7.0 | — | — | — |
| Surfonic 24-9[4] | 3.0 | 5.0 | 2.0 | 5.0 | 4.0 | 10.0 | 12.0 | 15.0 | 7.0 | — | 1.0 |
| Merquat ® 100[5] | — | — | 3.0 | 3.0 | — | 6.0 | — | 3.0 | 3.0 | 6.0 | 2.0 |
| Merquat ® 106[6] | 3.5 | 3.5 | — | — | — | — | — | — | — | — | — |
| Merquat ® 280[7] | — | — | — | — | 5.0 | — | 5.0 | — | — | — | — |
| Betaine[8] | 7.0 | 5.0 | 7.0 | 8.0 | 3.0 | 5.0 | 5.0 | 7.0 | 8.0 | 7.5 | 7.0 |
| TAE80[9] | — | — | — | — | 2 | — | — | — | — | — | 1 |
| Water | Balance to 100% | | | | | | | | | | |

[1] Alkyl ethoxylate sulfate, 3 moles of ethoxylation, available from The Procter & Gamble Company.
[2] Alkyl ethoxylate, available from The Procter & Gamble Company.
[3] Linear alkylbenzene sulfonate, available from The Procter & Gamble Company.
[4] Nonionic surfactant, available from Huntsman Corp.
[5] Homopolymer of diallyldimethyl ammonium chloride, polymer molecular weight of from about 100,000 to about 150,000.
[6] Homopolymer of diallyldimethyl ammonium chloride, polymer molecular weight from about 5,000 to about 15,000.
[7] Co-polymer of dimethyldiallyl ammonium chloride and acrylic acid, molecular weight of about 450,000 to 550,000 Daltons.
[8] Lauryl amido propyl betaines, or C12-C16 cocoamido propyl betaines (supplied from Inolex under the tradename Lexaine ® CG30).
[9] Dispersing agent, ethoxylated tallow amine, available from BASF.

Fabric Repair:

The present method and device may also be used to deposit wrinkle control compositions. Examples of fabric repair compositions include compositions that contain holes or tears in a fabric. For example, the composition may harden after application to a site of a hole or tear in a fabric material, to bind threads of the fabric together sufficiently to prevent significant further enlargening of the hole or tear. Such compositions are particularly useful for preventing the further 'running' of ladders or holes in articles of hosiery e.g. stockings or tights. Examples of compositions that may be used for this purpose include, but are not limited to compositions having a binding agent, such as, for example, nitrocellulose, cellulose propionate, cellulose acetate butyrate, ethyl cellulose, sucrose acetate isobutyrate, polyvinyl acetate, polyvinyl alcohol, an acrylic resin and/or polymethyl methacrylate, and an organic solvent. Additional examples of fabric repair compositions are described in more detail in GB2251437.

In other embodiments, the composition may comprise a water-soluble or water-dispersible rebuild agent for deposition onto a fabric during a treatment process. During the process, the material may undergo a chemical change by which change the affinity of the material for the fabric is increased. The chemical change may result in the loss or modification of one or more groups covalently bonded to be pendant to a polymeric backbone of the rebuild agent via an ester linkage. The ester linked group(s) are selected from monocarboxylic acid esters. Additionally, the composition may include substituted cellulose hydrodispersable (in particular a partially esterified cellulose hydrodispersable) in the presence of a water-soluble additive of precipitation of the cellulose (in particular an additive of deesterification of the aforesaid esterified cellulose). Still other compositions are described in more detail in FR 2784391.

Still other fabric repair compositions may include: chitosan, chitin and gelatin of one or more; or an organosilicon compound. The chitosan and/or chitin may he deposited on the fiber surface to form a water-insoluble film. The film may dry to be hard and clear, and apply physical effects inlay attached, ionic bonds and intermolecular forces to help bind the fibers together. The compositions may also generate a very high rubbing resistance, and improved fastness, so as to improve the durability of the fabric. An organic silicon compound can enter the interior of the fiber bulk softness of the fabric, the fabric movably and resilient film-forming surface of the fibers, the fabric forming a smooth surface of the fabric. These and other fabric repair compositions are disclosed in CN 103556464.

Other compositions for repairing fabric include compositions including acacia gum powder and are disclosed in more detail in US 2014/0047686.

Other Uses:

The method and device of the present invention can be used to apply other types of compositions to treat hard and flexible surfaces. For example, the following patents disclose compositions that can be used to help cleaning, help provide desirable characteristics to fabrics and other surfaces, and to help conserve material and energy when washing or otherwise treating fabrics: U.S. Pat. No. 6,503,413; US 2005/060811; and US 2005/098759.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for applying a composition to a surface to repair, refurbish and/or restore the surface, the apparatus including:
   a. an applicator head comprising a microfluidic die having one or more applicator nozzles;
   b. a reservoir to hold the composition;
   c. a sensor; and
   d. a CPU;

wherein the sensor is configured to sense at least a portion of the surface and provide the CPU with information about the surface, and wherein the CPU analyzes the information from the sensor to identify surface deviations, and the CPU activates the one or more applicator nozzles based on the surface deviations, wherein the sensor is a color sensor and the sensor and the CPU is programmed to identify a predetermined change in lightness value ("$\Delta L_S$ value") of plus or minus 1.5% of the background lightness ("background L").

2. The apparatus of claim 1, wherein the sensor senses variations in color, brightness, reflectance, refractance temperature, surface height, texture, material composition, or combinations thereof.

3. The apparatus of claim 1, wherein the sensor is a camera.

4. The apparatus of claim 1, wherein the microfluidic die includes a plurality of nozzles.

5. The apparatus of claim 1, wherein the microfluidic die includes a heating element or an electromechanical actuator.

6. The apparatus of claim 1, wherein the predetermined $\Delta L_S$ value is greater than 3.

7. The apparatus of claim 1, wherein the CPU is configured to activate the one or more nozzles to apply the composition to the surface where the surface deviations are located.

8. The apparatus of claim 1, wherein the CPU is configured to activate the one or more nozzles to apply the composition to the surface where the surface deviations are not located.

9. The apparatus of claim 1, wherein the CPU is configured to activate the one or more nozzles in a discontinuous deposition pattern.

10. The apparatus of claim 1, wherein the CPU is configured to activate the one or more nozzles in a continuous deposition pattern.

11. The apparatus of claim 1, wherein the number and or frequency of nozzles fired can be adjusted by a user of the apparatus.

12. The apparatus of claim 1 where the one or more nozzles are disposed in an array that is a linear configuration, multiple rows, off-set, sine wave, curved, circular, or saw tooth arrangements.

* * * * *